(12) United States Patent
Cavalet et al.

(10) Patent No.: US 11,938,665 B2
(45) Date of Patent: Mar. 26, 2024

(54) APPARATUS AND PROCESS FOR MOLDING BOTTLE PREFORMS

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Andrea Cavalet, Ponte Nelle Alpi (IT); Paolo Spinazze', San Vendemiano (IT); Federico Vescovo, Padua (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 0 days.

(21) Appl. No.: 17/754,100

(22) PCT Filed: Oct. 1, 2020

(86) PCT No.: PCT/IB2020/059206
§ 371 (c)(1),
(2) Date: Mar. 23, 2022

(87) PCT Pub. No.: WO2021/064630
PCT Pub. Date: Apr. 8, 2021

(65) Prior Publication Data
US 2022/0339831 A1    Oct. 27, 2022

(30) Foreign Application Priority Data
Oct. 1, 2019   (IT) .................... 102019000017675

(51) Int. Cl.
*B29C 45/17*  (2006.01)
*B29B 11/08*  (2006.01)
(Continued)

(52) U.S. Cl.
CPC .......... *B29C 45/1753* (2013.01); *B29B 11/08* (2013.01); *B29C 45/2602* (2013.01);
(Continued)

(58) Field of Classification Search
CPC ............ B29C 45/1753; B29C 45/2602; B29C 45/261; B29C 45/34; B29C 45/43; B29B 11/08; B29K 2067/003; B29K 2105/258
See application file for complete search history.

(56) References Cited

U.S. PATENT DOCUMENTS 7,158,854 B1 *  1/2007  Kolander ............... B29C 45/34
                                                      700/200
2006/0198974 A1 *  9/2006  Miller .................. B29C 49/071
                                                      264/334

FOREIGN PATENT DOCUMENTS

CN    201325148 Y    10/2009
CN    209079121 U    7/2019
(Continued)

OTHER PUBLICATIONS

Patent Cooperation Treaty, International Search Report and Written Opinion for International Application No. PCT/IB2020/059206, dated Jan. 15, 2021, 14 pages.

*Primary Examiner* — Ryan M Ochylski
(74) *Attorney, Agent, or Firm* — Stetina Brunda Garred & Brucker (57) ABSTRACT

A process for molding one or more bottle preforms, wherein molten plastic is injected into at least one molding cavity; and wherein air is drawn from the at least one molding cavity, through at least one channel for the air to pass from
(Continued)

the at least one molding cavity towards the outside of the molding device, by means of suction means; and apparatus and device for performing such a process.

16 Claims, 9 Drawing Sheets

(51) Int. Cl.
*B29C 45/26* (2006.01)
*B29C 45/34* (2006.01)
*B29K 67/00* (2006.01)

(52) U.S. Cl.
CPC ............ *B29C 45/261* (2013.01); *B29C 45/34* (2013.01); *B29K 2067/003* (2013.01)

(56) References Cited

FOREIGN PATENT DOCUMENTS

| JP | 6126740 | † | 5/1994 |
| JP | 2867519 B2 | | 3/1999 |
| JP | 2003191293 A | | 7/2003 |
| WO | 2012019304 | † | 2/2012 |
| WO | 2012019304 A1 | | 2/2012 |
| WO | 2012055038 A1 | | 5/2012 |
| WO | 2018098564 A1 | | 6/2018 |

\* cited by examiner
† cited by third party

APPARATUS AND PROCESS FOR MOLDING BOTTLE PREFORMS

CROSS-REFERENCE TO RELATED APPLICATIONS

This application claims priority to PCT International Application No. PCT/IB2020/059206 filed on Oct. 1, 2020, which application claims priority to Italian Patent Application No. 102019000017675 filed on Oct. 1, 2019, the disclosures of which are expressly incorporated herein by reference.

STATEMENT RE: FEDERALLY SPONSORED RESEARCH/DEVELOPMENT

Not applicable.

BACKGROUND OF THE INVENTION

Field of the Invention

The present invention relates to the field of molding plastic bottle preforms, in particular made of thermoplastic material, such as PET.

The present invention in particular relates to an apparatus and a device for molding bottle preforms and a process for molding bottle preforms.

Background Art

The preforms of plastic bottles, in particular made of thermoplastic material, conventionally are manufactured by means of an injection molding or injection-compression molding process. In such processes, a given quantity of molten thermoplastic polymeric material is injected at a high pressure into a mold, which imparts the shape of the preform.

The molds are designed so as to have vent passageways to expel gas from the molding cavity, in particular air and volatile compounds generated by the degradation of the polymer.

The known molding apparatuses and processes provide for the gases inside the molding cavity to be expelled during the injection of the polymer exclusively by the molten polymer entering the molding cavity.

However, often the gases in the molding cavity are not adequately expelled, in particular they are only partially expelled.

Therefore, disadvantageously, air is trapped and the molding cavity is not filled, and unacceptable defects may be generated on the preforms, such as, for example, burrs, burns and flow lines. Such defects are more pronounced and occur more frequently as the injection speed increases.

Moreover, disadvantageously, the volatile compounds condensate on the surfaces delimiting the vent passageways, which tend to become obstructed. Therefore, production is to be stopped to perform cleaning operations of the vent passageways. At the state of the art, the cleaning operations require disassembling several components and they are not easy.

Another common defect of molded preforms is the presence of visible marks, generally in the form of lines, due to the presence of the vent passageways. Such defects occur in particular at the preform neck and are due to the vent passageways, at the parting line, of the mold component which molds the outer surface of the preform neck.

Therefore, the need is felt to reduce the defects of the preforms caused by the inadequate ejection of the gases from the molding cavity.

The need is also felt to reduce or eliminate the defects of the preforms, in particular at the neck, due to the presence of the vent passageways of the mold.

SUMMARY OF THE INVENTION

It is an object of the present invention to improve the ejection of gases from the molding cavity so as to reduce the defects of the molded preforms.

It is another object of the present invention to reduce the obstruction of the vent passageways so as to reduce the maintenance for cleaning the vent passageways.

It is another object of the present invention to reduce the defects of the preforms, in particular at the neck, due to the presence of the vent passageways.

It is another object of the present invention to simplify the maintenance operations of the molding devices, in particular by reducing the number of components to be disassembled to perform cleaning operations.

It is a further object of the present invention to simplify the construction of the molding devices.

The present invention achieves at least one of such objects, and other objects which will be apparent in light of the present description, by means of a device according to claim 1, for an apparatus for molding one or more bottle preforms by injecting molten plastic, the molding device being provided with at least one molding cavity adapted to receive the molten plastic, and with at least one channel for air to pass from the at least one molding cavity towards the outside of the molding device; said at least one channel being adapted to be connected to suction means adapted to draw air from the at least one molding cavity;

wherein said at least one molding device comprises
a first component, or core, adapted to mold the inner surface of the preform;
a second component, or lock ring, arranged about the first component;
and a third component, or neck ring, adapted to mold the outer surface of the preform neck;
wherein said at least one channel is partially delimited by said first component and by said third component and partially by said first component and by said second component;
wherein the first component comprises at least a first surface in contact with at least a second surface of the second component;
wherein said first surface and/or said second surface are provided with at least one groove which partially delimits said at least one channel;
wherein said first surface and said second surface are frustoconical in shape.

In particular, the molding device is configured to be connected to the suction means so that the suction means can draw air from the molding cavity through said at least one channel.

The invention also relates to a molding apparatus, according to claim 13.

The invention also relates to a process for molding, according to claim 14, one or more bottle preforms, wherein molten plastic is injected into the at least one molding cavity;

and wherein air is drawn from the at least one molding cavity, through said at least one channel for the air to pass from the at least one molding cavity towards the outside of the molding device, by means of suction means connected to said at least one channel.

Such a process advantageously allows the gases, in particular air and any volatile compounds or debris, to be effectively removed from the molding cavity.

Indeed, by activating the suction means, a flow of air is generated from the molding cavity towards the outside of the molding device. More particularly, a depression, i.e. a vacuum, is generated in the molding cavity.

Therefore, this allows avoiding or minimizing the formation of air pockets and the occurrence of failed filling of the molding cavity during injection of the molten plastic.

Advantageously, the defects of the molded preforms, such as in particular burrs, burns and flow lines, are avoided or minimized.

Moreover, the drawing advantageously allows the accumulation of volatile compounds or debris to be avoided or minimized on the mold surfaces delimiting the vent passageways, when provided. Therefore, the maintenance frequency is reduced, in particular of the maintenance for cleaning the vent passageways.

Moreover, the process and the apparatus of the invention advantageously allow the gap of the vent passageways, in particular of the vent passageways adjacent to the molding surfaces, of the component which molds the outer surface of the preform neck, i.e. of the component referred to as "neck ring", to be reduced.

Therefore, the linear defects which may occur on the molded preform neck, at the parting line of the neck ring, are minimized.

The process, the device and the apparatus of the invention advantageously also provide the opportunity of eliminating the vent passageways adjacent to the molding surfaces of the neck ring. In this particular, non-limiting embodiment, the possibility for the aforesaid linear defects to occur on the neck of the preforms is minimized or eliminated.

The suction means, which, for example comprise or consist of a pump or a suction fan, advantageously can be connected to the air distribution system with which also the known apparatuses are provided, in which such air distribution system is exclusively used during the extraction of the preform by introducing air into the molding device. The apparatus and the device according to the invention therefore allow the same air distribution system to be used both for drawing air from the molding cavity prior to and/or during the injection of the molten plastic and for introducing air during the preform extraction step.

Particular embodiments however can be provided, in which the apparatus comprises two separate air distribution systems, one for the drawing to generate the vacuum in the molding cavity and one for introducing air for extracting the preform.

In addition to effectively allowing the aforesaid drawing to be performed, the molding device advantageously also allows the maintenance operations to be simplified, in particular by reducing the number of components to be disassembled in order to perform the cleaning operations, and can be made in a particularly simple and affordable manner. Indeed, a component (called vent ring or core ring) arranged both between the third component (neck mold) and the first component (core), and between the second component (lock ring) and the first component is not required, and preferably is not provided.

The absence of the vent ring considerably simplifies the maintenance operations, in particular cleaning, and further simplifies making the molding device. The absence of the vent ring also allows the undesired visible marks on the molded preform to be reduced.

Moreover, holes made in the side wall of the lock ring, in particular at the frustoconical portion thereof, advantageously are not required, and preferably are not provided. The presence of such holes indeed would complicate making the molding device (such holes indeed generally have a high length/diameter ratio) and further, such holes would be difficult to clean.

Optionally, one or more holes are provided in the end portion only of the lock ring, distal from the molding cavity.

Further features and advantages of the invention will become more apparent in light of the detailed description of exemplary but not exclusive embodiments.

The dependent claims describe particular embodiments of the invention.

BRIEF DESCRIPTION OF THE FIGURES

In the description of the invention, reference is made to the accompanying drawings, which are provided by way of non-limiting example, in which.

The same elements and components, or substantially functionally equivalent elements and components, have the same reference numeral.

DESCRIPTION OF EXEMPLARY EMBODIMENTS OF THE INVENTION

With reference to the Figures, embodiments of an apparatus 100, a device 1 and a process for molding one or more bottle preforms (not shown) are described. The preforms in particular are made by injecting molten plastic, or in other words, molten polymer, into a molding cavity 5. The preforms are made, for example of polyethylene terephthalate (PET).

In all the embodiments, the apparatus 100 comprises at least one molding device 1, also referred to as injection stack assembly.

The molding device 1 defines an axis X, preferably a longitudinal axis.

The molding device 1 is provided with at least one molding cavity 5 adapted to receive the molten plastic, and with at least one channel 2 for the air to pass from the at least one molding cavity 5 towards the outside of the molding device 1.

Said at least one channel 2 in particular is external to the molding cavity 5, in particular completely external to the molding cavity 5.

Apparatus 100 also comprises suction means 102, for example comprising or consisting of a pump or a suction fan, which are connected to said at least one channel 2, which are adapted to draw air from the at least one molding cavity 5. In addition to the air, the suction means 102 may also draw debris, for example organic particles, which substantially are dragged by the suction air flow.

Apparatus 100 preferably comprises a plurality of molding devices 1. In this case, the suction means 102 preferably are connected to each channel 2 of the molding devices 1.

The molding device 1 in particular comprises the following components:

a component referred to as core 10, defining the inner surface of the preform, i.e. which has a molding surface 10b (FIG. 3A) which molds the inner surface of the preform, preferably the inner surface of the entire preform. The molding surface 10b is an end portion of core 10, while the remaining part of core 10 is outside the molding cavity 5. A tube 11, also referred to as cooling tube, which in particular serves to cool core 10, and therefore the preform, preferably is provided inside the core 10. Air may be introduced into the molding device 1 through tube 11.

a component referred to as neck mold 30 or neck ring or neck insert, defining the outer surface of the preform neck, i.e. which has a molding surface which molds the outer surface of the preform neck, including the threaded portion (when provided). The neck mold 30 comprises two neck half-molds 31, 32.

a support component, referred to as support ring 20 or lock ring, which preferably is substantially an annular body. The support ring 20 in particular serves to support core 10 and to ensure the correct alignment thereof. Therefore, the support ring 20 is constrained to core 10. The support ring 20 also surrounds core 10, in particular the part of core 10 external to the molding cavity 5. An end of the support ring 20 preferably abuts against the neck mold 30.

The molding device 1 also comprises a component referred to as body mold 61 or cavity, defining the outer surface of the preform body, i.e. which has a molding surface which molds at least or only the outer surface of the preform body. The preform body is adjacent to the preform neck and preferably comprises at least a substantially cylindrical portion. Therefore, the molding surface of the body mold 61 preferably comprises at least a substantially cylindrical portion.

The body mold 61 is a distinct component from the neck mold 30.

The molding device 1 preferably further comprises a component referred to as gate insert 62, which is adapted to mold the outer surface of the bottom of the preform, for example the substantially hemispherical surface. The molten plastic is injected through the gate insert 62. In variants not shown, the body mold 61 may optionally also mold the outer surface of the bottom portion of the preform, substantially serving the function of the gate insert 62 which is not present.

The molding device 1 preferably further comprises a flange 63, also referred to as cavity flange, which is fastened to the body mold 61 and is arranged about the neck mold 30 and about the body mold 61.

The molding cavity 5 is delimited by the core 10, the neck mold 30, 30', the body mold 61, and optionally by the gate insert 62, when the latter is provided.

With particular reference to FIGS. 2 to 5, the channel 2 is delimited by the core 10, by the neck mold 30 and by the support ring 20. In particular, the channel 2 is partly delimited by the neck mold 30 and by the core 10, and partly by the support ring 20 and by core 10. More in detail, channel 2 is at least partly delimited by the inner surface, in particular inner side surface, of the support ring 20 and by at least part of the inner surface, in particular inner side surface, of the neck mold 30, which face the outer surface of core 10. The distance, in particular transversely with respect to axis X, between said outer surface of core 10 and said inner surface of the neck mold 30 may, for example, be from 0.1 to 5 mm; and/or the distance, in particular transversely to axis X, between said outer surface of core 10 and said inner surface of the support ring 20 may, for example, be from 0.1 to 10 mm.

Channel 2 preferably is delimited only by core 10, by the neck mold 30 and by the support ring 20.

Preferably, there are no components or intermediate bodies (i.e. interposed bodies) between the neck mold 30 and core 10; in particular, the inner surface of the neck mold 30 directly faces a portion of the outer surface of core 10. Moreover, preferably, there are no intermediate components between the support ring 20 and core 10; in particular, the inner surface of the support ring 20 directly faces a portion of the outer surface of core 10.

Figures 4, 5:
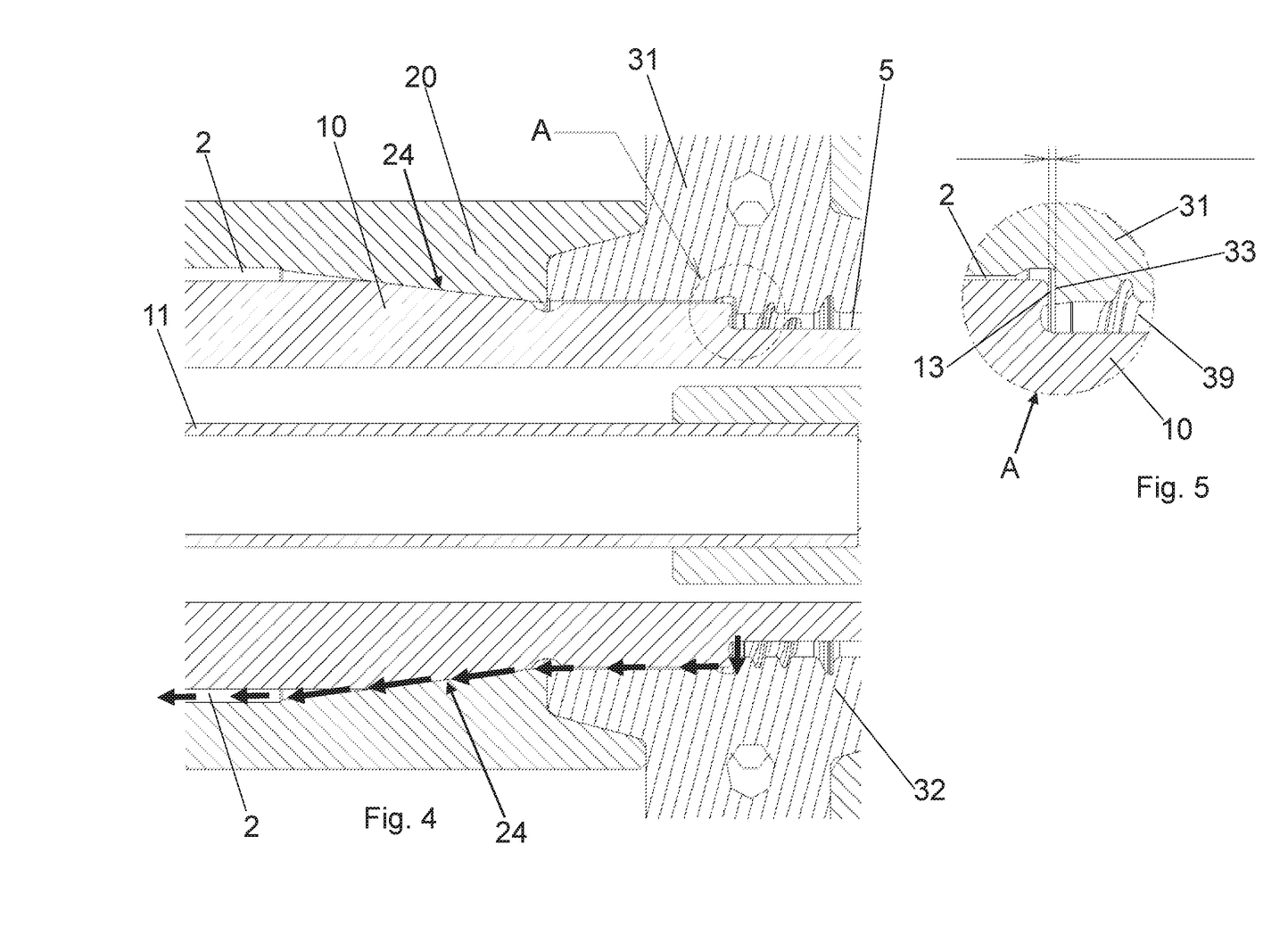
FIG. 4 shows an enlarged detail of FIG. 2.
FIG. 5 shows an enlarged detail of FIG. 4.

As shown in particular in FIGS. 4 and 5, the molding device 1 preferably is configured so that core 10 and the neck mold 30 are spaced apart from each other also parallel to axis X so as to allow air to pass from the molding cavity 5 into channel 2. The inlet of the passageway substantially is close to the area which molds the brim of the preform mouth. Preferably, the surface 33 (FIG. 5) of the neck mold 30 faces and is spaced apart from a surface 13 of the core 10 to allow the aforesaid passage from the molding cavity 5 to channel 2.

Surface 33 in particular is a non-molding surface, adjacent to the molding surface 39 of the neck mold 30, and surface 33 is substantially perpendicular to axis X.

Surface 33 and surface 13 preferably are annular.

It should be noted in particular that core 10 and the neck mold 30 are spaced apart from each other to allow the aforesaid passage from the molding cavity 5 to channel 2 when the molding device 1 is in closed position, i.e. in the position in which the molten plastic is injected.

The aforesaid distance between core 10 and the neck mold 30, for example between surface 33 and surface 13, preferably is from 0.005 to 0.07 mm.

Figure 3:
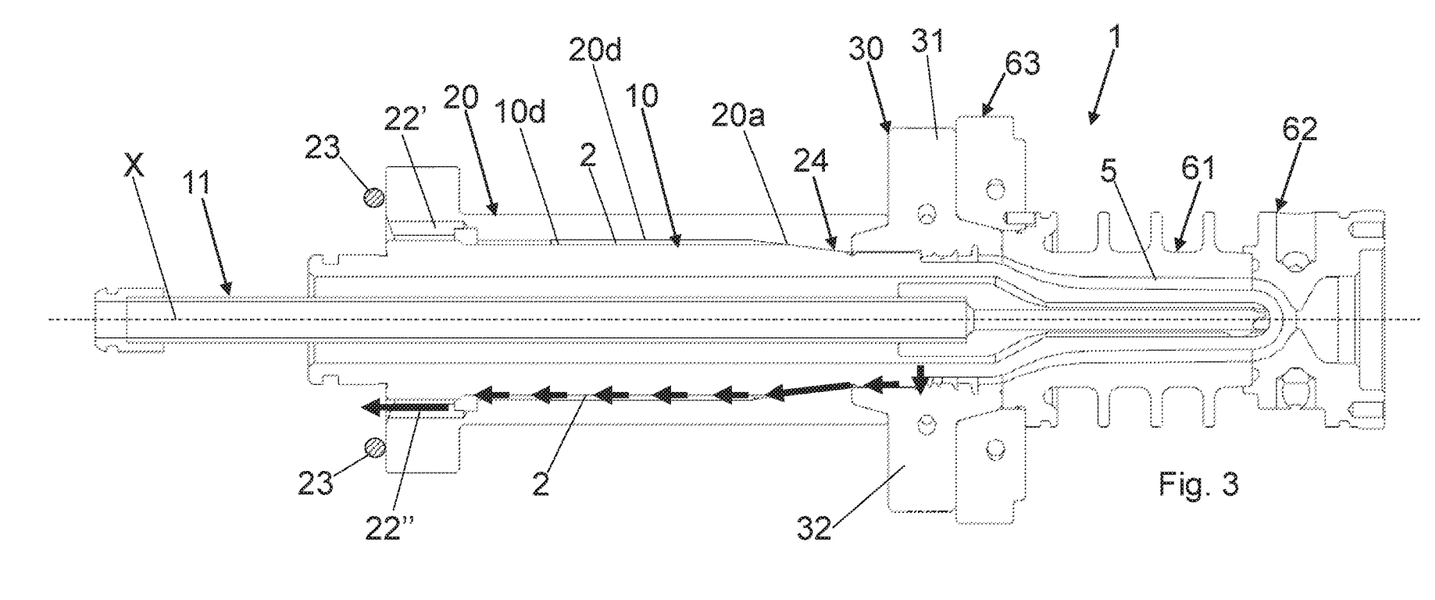
FIG. 3 diagrammatically shows the section of FIG. 2.

Part of the path followed by the air drawn from the molding cavity 5 which crosses channel 2 is diagrammatically indicated by the arrows in FIGS. 3 and 4.

Channel 2 communicates on one side with the molding cavity 5, and on the opposite side, in particular parallel to axis X, channel 2 communicates with the outside of the molding device 1, in particular it communicates with the suction means 102, for example through two or more holes 22', 22" in an end portion of the support ring 20, in particular in the longitudinal end portion which is distal from the molding cavity 5. Alternatively, channel 2 may also communicate with the outside in other ways, for example by providing an annular opening, about axis X, in the end portion of the support ring 20, or by providing one or more grooves on the outer surface of the end portion of core 10 and/or on the inner surface of the support ring 20. In other words, the molding device 1 comprises a stretch or passageway obtained in an end portion, distal from the molding cavity 5, of the molding device 1, preferably of the second component 20. Said at least one channel 2 may communicate with the outside of the molding device 1, in particular with the suction means 2, by means of said stretch. In other words, said stretch substantially forms part of said at least one channel 2, i.e. said at least one channel comprises said stretch.

Figure 3A:
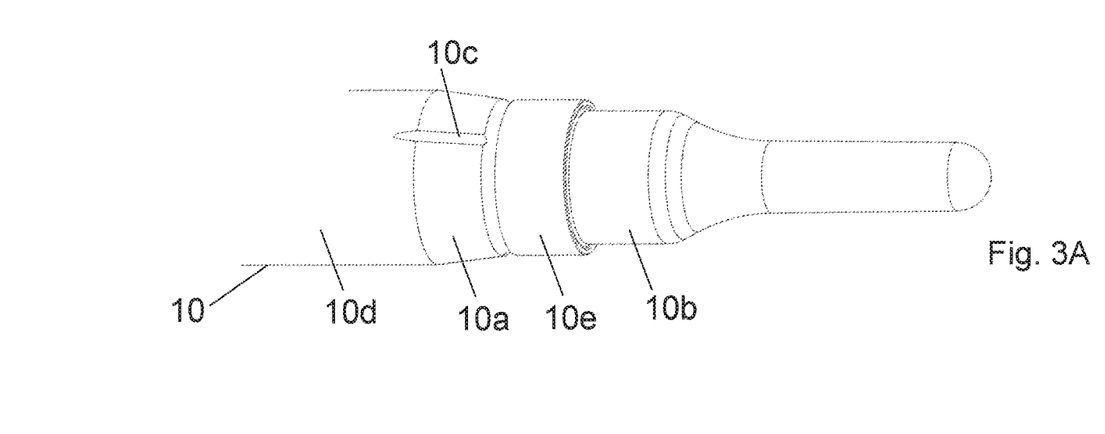
FIG. 3A shows a side view of part of a component of the device of FIG. 2.
Figures 3B, 3C:
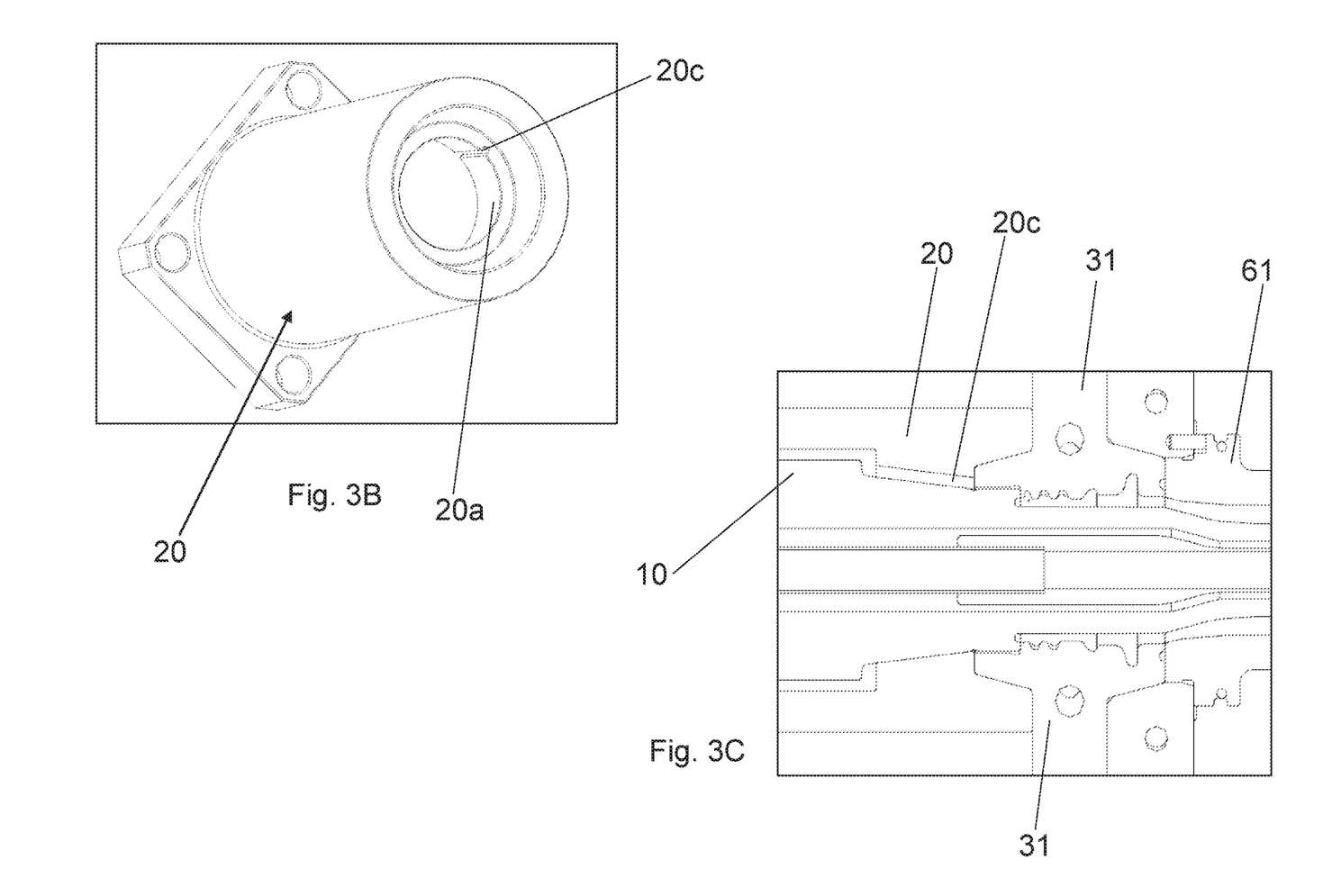
FIG. 3B shows a perspective view of an example of a component of a device according to the invention.
FIG. 3C shows a section of an example of device according to the invention.

The molding device 1 comprises at least one area 24, in particular an annular area, in which core 10 and the support ring 20 are in mutual contact so that the support ring 20 can ensure the correct alignment of core 10. In particular, core 10 comprises a frustoconical surface 10a (FIG. 3A), and the support ring 20 comprises a frustoconical surface 20a (FIG. 3), the two frustoconical surfaces 10a, 20a being in mutual contact. To allow an effective passage of air, the frustoconical surface 10a of core 10 and/or the frustoconical surface 20a of the support ring 20 is provided with at least one groove 10c, 20c (FIG. 3A shows a groove 10c of core 10; FIGS. 3B and 3C show a groove 20c of the lock ring 20), which delimits part of channel 2. One, two or more grooves 10c, or recesses, made in the frustoconical surface 10a of core 10 and/or one, two or more grooves 20c, or recesses, made in the frustoconical surface 20a of the support ring 20, may, for example, be provided. The groove(s) 10c of core 10 and/or the groove(s) 20c of the support ring 20 preferably extend substantially longitudinally. In particular, each groove 10c extends in distal direction from the molding cavity 5. Each groove 10c, 20c preferably is rectilinear or substantially rectilinear. The depth of each groove 10c may be, for example from 0.1 to 5 mm, and the same for each groove of the support ring 20.

The aforesaid frustoconical surfaces 10a, 20a in particular serve to allow a correct centering of core 10.

With particular reference to FIG. 3A, the core 10 comprises the molding portion or surface 10b, i.e. adapted to define the inner surface of a preform. The frustoconical surface 10a is distinct from portion 10b, i.e. the frustoconical surface 10a is not a molding surface. A cylindrical portion or surface 10e preferably is provided between the molding portion 10b and the frustoconical portion 10a. The cylindrical surface 10e in particular is adapted to face a surface of the neck mold 30. A portion or surface 10d adapted to face a surface 20d of the support ring 20, adjacent to the frustoconical portion 10a, is preferably provided. Surface 10d and surface 20d are separate from each other, thus defining part of channel 2, as described above. Optionally, the groove 10c also partly extends in surface 10d. Surface 10d preferably is cylindrical.

In the embodiment shown in FIGS. 2 to 5, the air drawn by the suction means 102 comes out of the molding cavity 5, is introduced into an annular part of channel 2 delimited by the core 10 and by the neck mold 30; it is introduced into one or more grooves 10c, 20c of the core 10 and/or of the support ring 20, in particular at area 24; it is introduced into the annular part of channel 2 delimited by core 10 and by the support ring 20; it is introduced into the stretch or passageway made in the end portion of the molding device 1, for example in the holes 22', 22" of the support ring 20, from which it comes out of the molding device 1.

In other words, said at least one channel 2 comprises a first stretch, or initial stretch, delimited by a portion of the inner surface of the third component 30 and by a portion of the outer surface of the first component 10, which portions face each other; a second stretch delimited, preferably partly delimited, by said at least one groove 10c, 20c; and a third stretch delimited by a portion of the inner surface of the second component 20 and by a portion of the outer surface of the first component 10, which portions face each other. More particularly, said second stretch preferably is delimited by each groove 10c, 20c and by the portion of frustoconical surface of core 10 or of the lock ring 20 facing it (depending on whether it is a groove 10c of core 10 or a groove 20c of the lock ring 20).

Said first stretch is proximal to the molding cavity 5; and said second stretch is between the first stretch and the third stretch.

Said first stretch, second stretch and third stretch are arranged in sequence with one another, in particular along axis X. Therefore, the air drawn from the molding cavity 5 crosses the first stretch, second stretch and the third stretch in sequence.

The aforesaid stretch (also referred to as fourth stretch) made in the end portion of the molding device 1 is provided after the third stretch.

Channel 2 in particular is substantially a continuous channel, comprising said first stretch, second stretch, third stretch and fourth stretch.

By way of example only, when more than one groove 10c and/or 20c is provided at area 24, the second stretch of the channel preferably comprises a corresponding number of passageways.

The aforesaid first stretch in particular is delimited by non-molding surfaces of the third component 30.

Said first stretch and said third stretch of said at least one channel 2 preferably are annular in shape.

A molding device 1' comprising also an annular body 40, also referred to as vent ring or core ring, is shown with particular reference to FIGS. 6 to 9. The annular body 40 in particular is partly arranged between the neck mold 30' and core 10', and partly between the support ring 20' and core 10'. The annular body 40 preferably is provided with a frustoconical surface in contact with a frustoconical surface of the support ring 20'.

Channel 2' is delimited by core 10', by the annular body 40 and by the support ring 20'. In particular, channel 2' is partly delimited by the annular body 40 and by core 10', and partly by the support ring 20' and by core 10'. More in detail, channel 2' is at least partly delimited by the inner surface of the support ring 20' and at least partly by the inner surface of the annular body 40, which face the outer surface of core 10'. The distance, in particular transversely with respect to axis X, between said outer surface of core 10' and said inner surface of the annular body 40 may, for example be from 0.1 to 5 mm; and/or the distance, in particular transversely to axis X, between said outer surface of core 10' and said inner surface of the support ring 20' may, for example be from 0.1 to 10 mm.

A part of channel 2' preferably is delimited by one or more holes 41 (FIGS. 6, 7 and 8), which preferably are transverse to axis X, with which the annular body 40 is provided.

Channel 2' preferably is delimited only by core 10', by the annular body 40 and by the support ring 20'.

Figure 8:
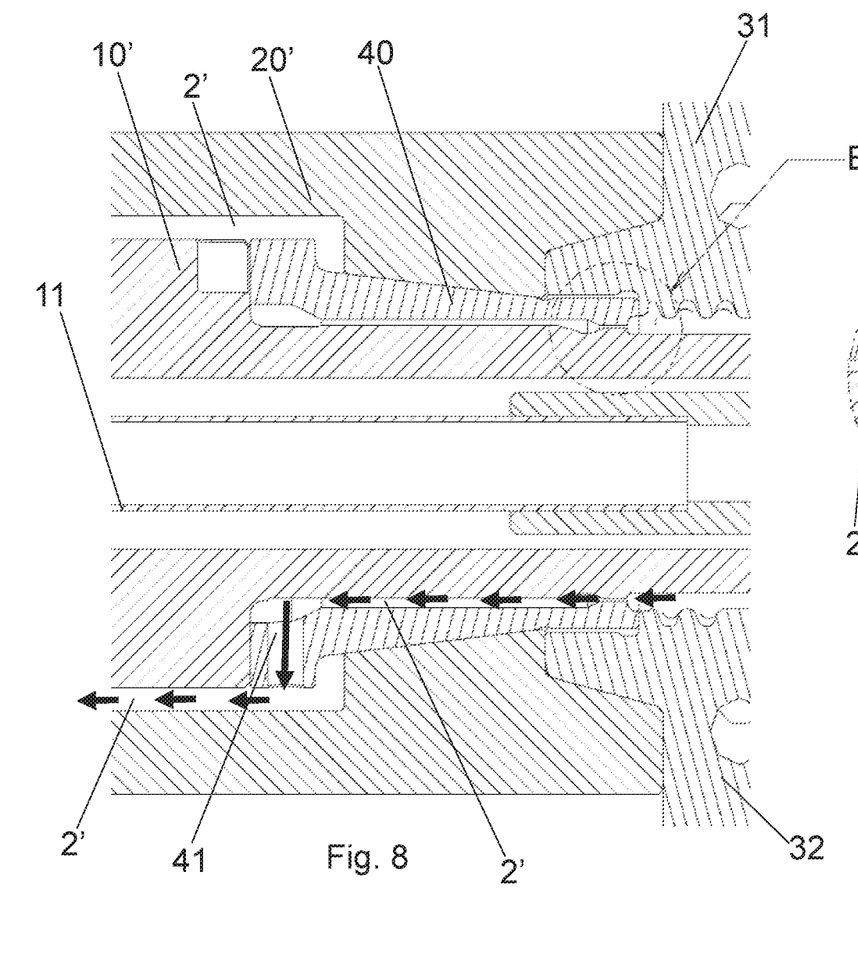
FIG. 8 shows an enlarged detail of FIG. 6.
Figure 9:
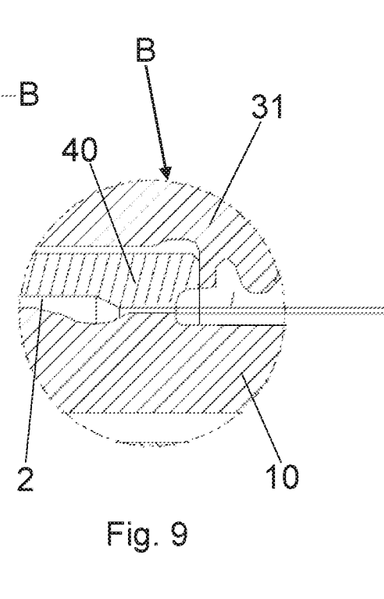
FIG. 9 shows an enlarged detail of FIG. 8.
Figure 10:
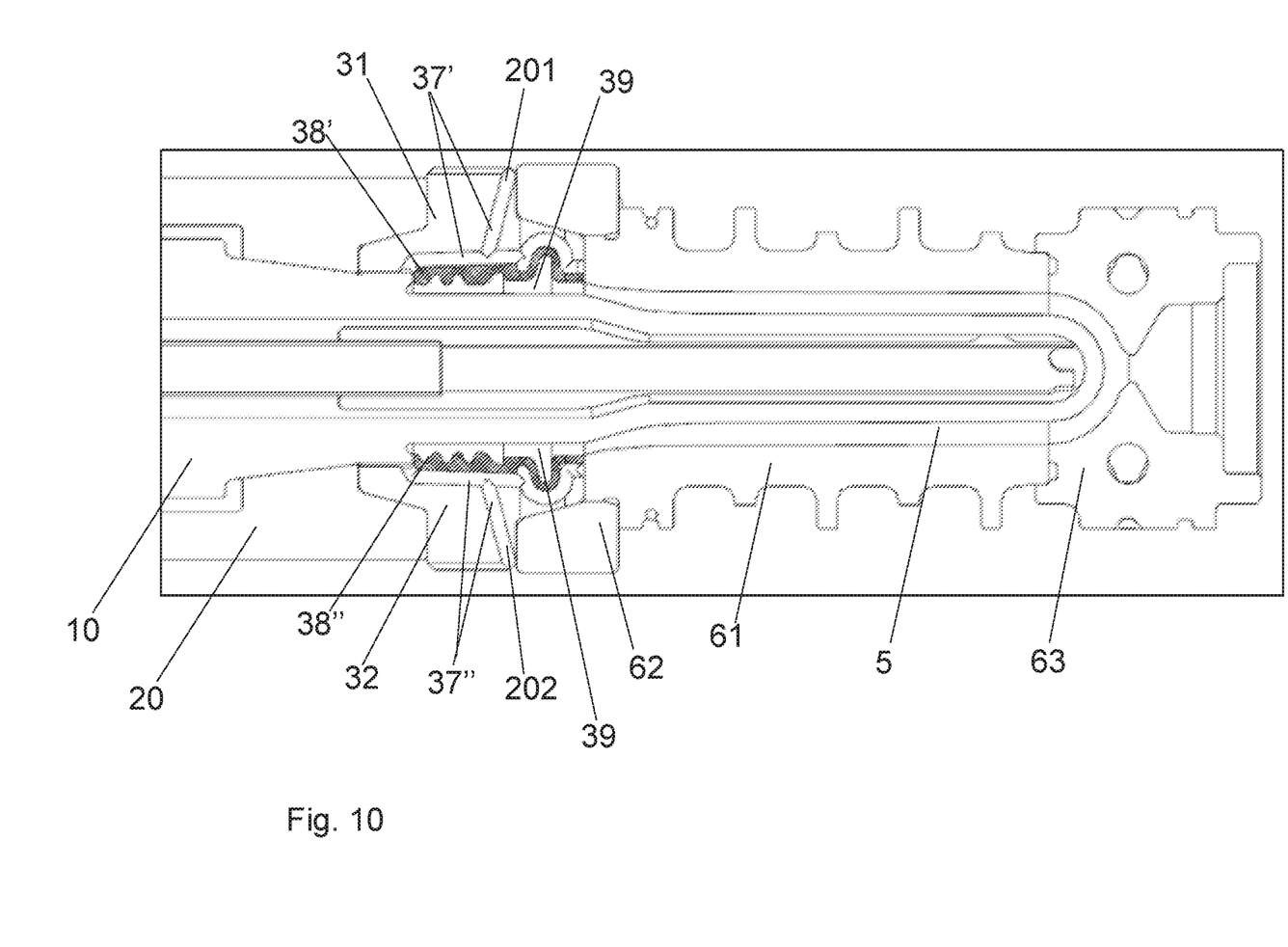
FIG. 10 diagrammatically shows part of the section of FIG. 3.

As shown in particular in FIGS. 8 and 9, the molding device 1' preferably is configured so that the core 10' and the annular body 40 are spaced apart from each other, in particular transversely to axis X, so as to allow air to pass from the molding cavity 5 into channel 2'. The inlet of the passageway substantially is at the area which molds the brim of the preform mouth.

Figure 7:
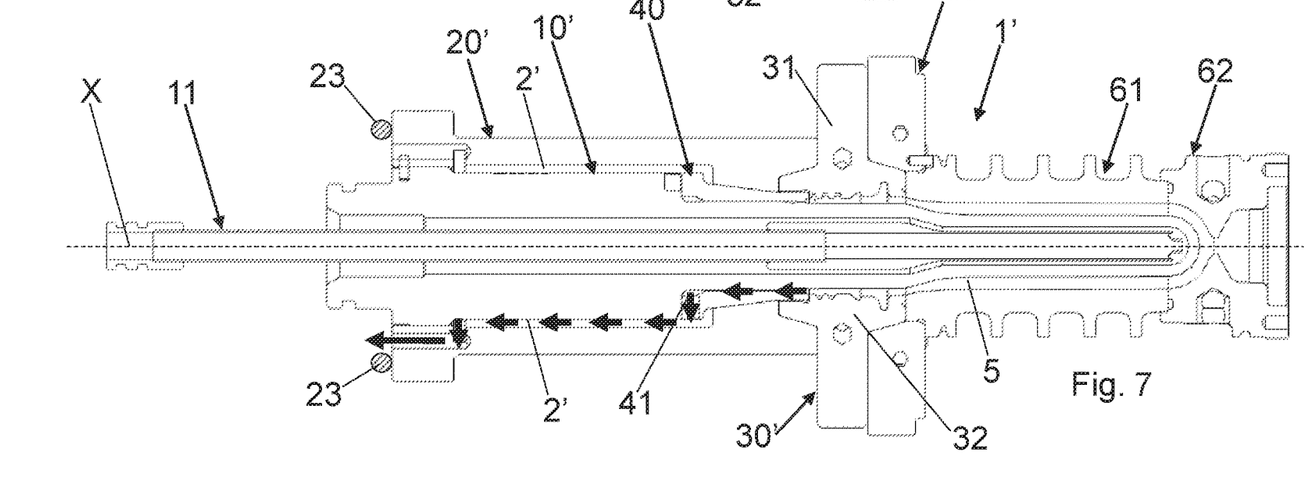
FIG. 7 diagrammatically shows the section of FIG. 6.

Part of the path followed by the air drawn from the molding cavity 5 which crosses channel 2' is diagrammatically indicated by the arrows in FIGS. 7 and 8.

Channel 2' communicates on one side with the molding cavity 5, and on the opposite side, in particular parallel to axis X, channel 2' communicates with the outside of the molding device 1', for example through two or more holes 22', 22" in an end portion of the support ring 20', in particular in the longitudinal end portion which is distal from the molding cavity 5. Alternatively, channel 2' may also communicate with the outside in other ways, for example by providing an annular opening, about axis X, in the end portion of the support ring 20', or by providing one or more grooves on the outer surface of the end portion of core 10' and/or on the inner surface of the support ring 20'.

In the example shown in FIGS. 6 to 9, the air drawn by the suction means 102 comes out of the molding cavity 5, is introduced into an annular part of channel 2' delimited by core 10' and by the annular body 40; it is introduced into one or more holes 41 of the annular body 40; it is introduced into the annular part of channel 2' delimited by core 10' and by the support ring 20'; it is introduced into the holes 22', 22" of the support ring 20', from which it comes out of the molding device 1'.

Figure 6:
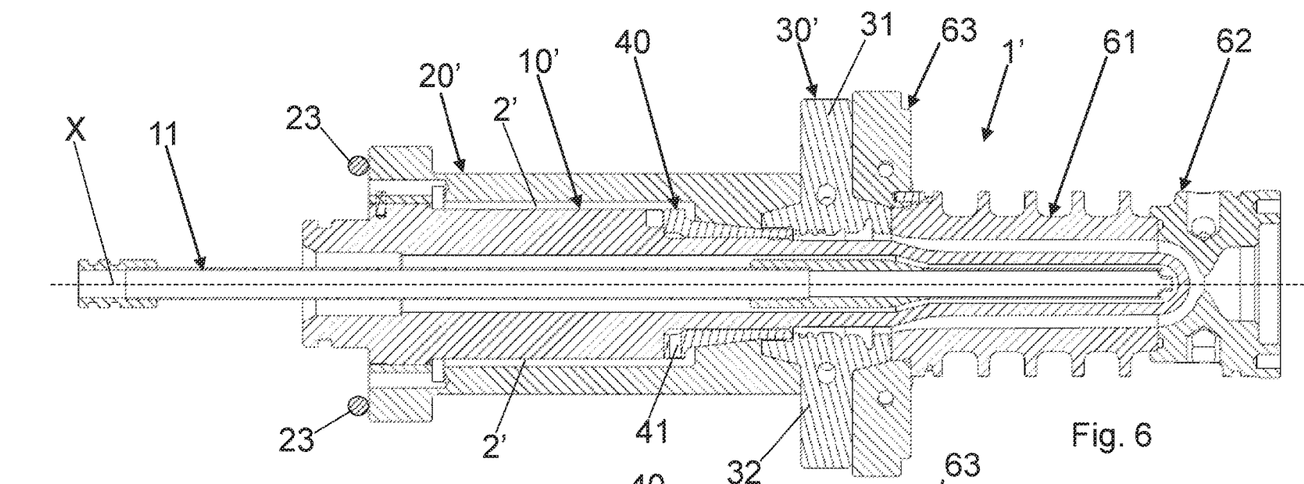
FIG. 6 shows a section of another example of molding device.

The molding device 1 (FIGS. 2, 3, 4) is more advantageous with respect to the molding device 1' (FIGS. 6, 7, 8).

Indeed, the absence of the annular body 40 considerably simplifies the maintenance operations, in particular the cleaning, of the molding device 1 with respect to the molding device 1'. Indeed, it is required to disassemble a lower number of components and there are fewer areas where debris may accumulate.

A further interface with respect to the molding device 1 is caused due to the annular body 40. Said interface induces undesired visible marks on the brim of the preform mouth. Moreover, due to the annular body 40, there are further areas where debris infiltrates, and which therefore must be cleaned.

More in detail, the absence of the annular body 40 and the subsequent creation of the division surface not between annular body 40 and core 10 but between core 10 and neck ring 30 results in such a division surface being easily reached, and therefore cleanable, directly without the need to disassemble any part of the molding device 1. To make such a surface accessible, it is sufficient to position the mold in extraction position, a position already provided in the standard operating cycle.

With particular reference to FIGS. 10 to 14, in all the embodiments the neck mold 30, 30' comprises two parts or half-molds 31, 32, as already mentioned. The half-molds 31, 32 can be mounted and disassembled to/from each other and are substantially similar to each other.

Each half-mold 31, 32 comprises a respective molding surface 39. A respective surface 38', 38" extends from each side of the molding surface 39. The surfaces 38', 38" are adjacent to the molding surface 39 and are non-molding, i.e. they are not destined to come into contact with the molten plastic to mold the preform.

Although only the surfaces 38', 38" of the half-mold 31 are shown, also the half-mold 32 is provided with similar surfaces.

Each surface 38', 38" of the half-mold 31 faces a respective surface 38', 38" of the half-mold 32.

A groove 37', 37", which preferably is lowered with respect to surface 38', 38", preferably is provided laterally to each surface 38', 38". Part of groove 37', 37" preferably is adjacent to the respective surface 38', 38". When the two half-molds 31, 32 are assembled, the grooves 37', 37" delimit a channel 201, 202 for air, and possibly debris, to come out of the molding cavity 5. In particular, groove 37' of the half-mold 31 and the corresponding groove 37' of the half-mold 32 delimit a channel 201 (the two grooves 37' facing each other); and similarly grooves 37" of the half-mold 31 and the corresponding groove 37" of the half-mold 32 delimit a channel 202 (the two grooves 37" facing each other). The channels 201, 202 communicate with the outside of the molding device 1, 1'.

In a first variant (FIGS. 11 to 13), at least one respective ridge 36', 36" extends from each surface 38', 38". Therefore, when the two half-molds 31, 32 are assembled, each surface 38', 38" of the half-mold 31 is spaced apart from a respective surface 38', 38" of the half-mold 32, for example by a distance from 0.005 mm to 0.07 mm, preferably from 0.005 to 0.01 mm.

Figure 11:
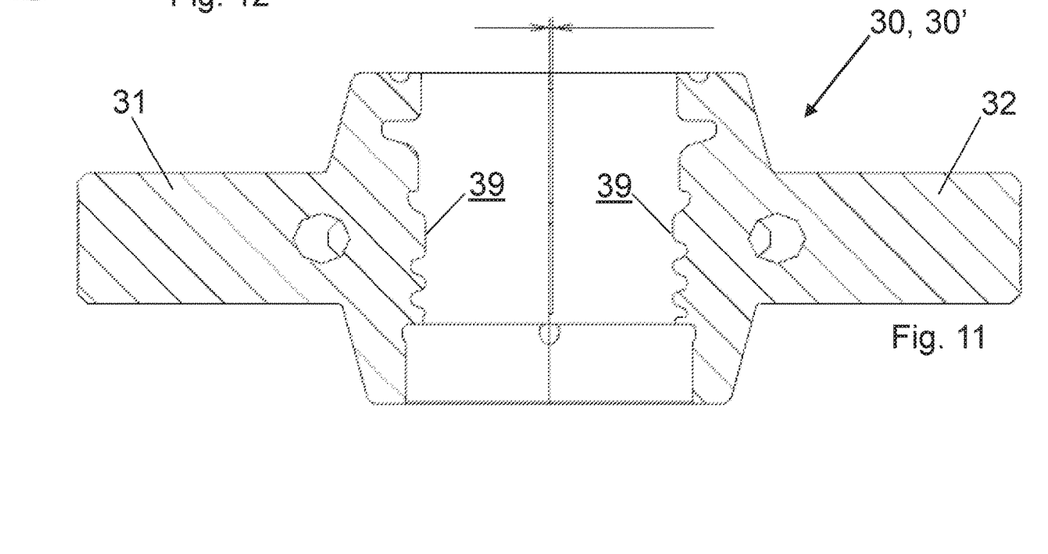
FIG. 11 shows a section of an example of two parts of a component of a device according to the invention.
Figure 12:
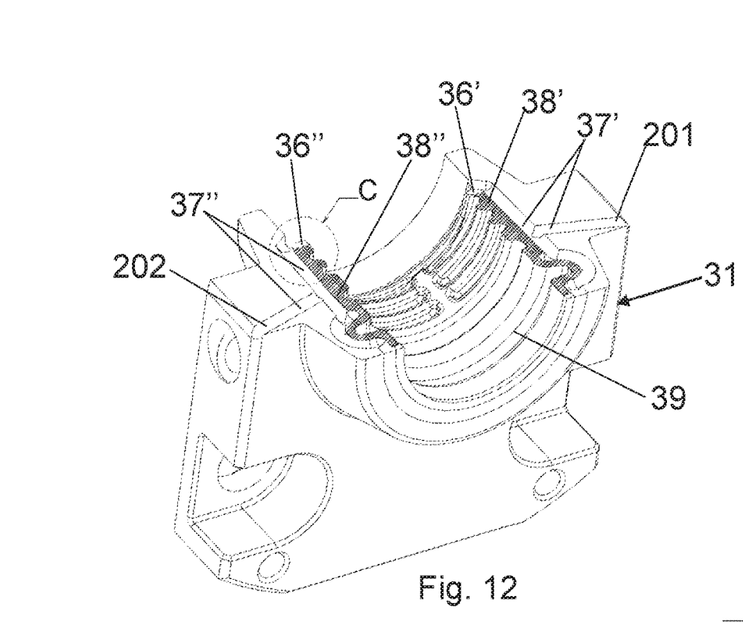
FIG. 12 shows a perspective view of a part of the component of FIG. 11.
Figure 13:
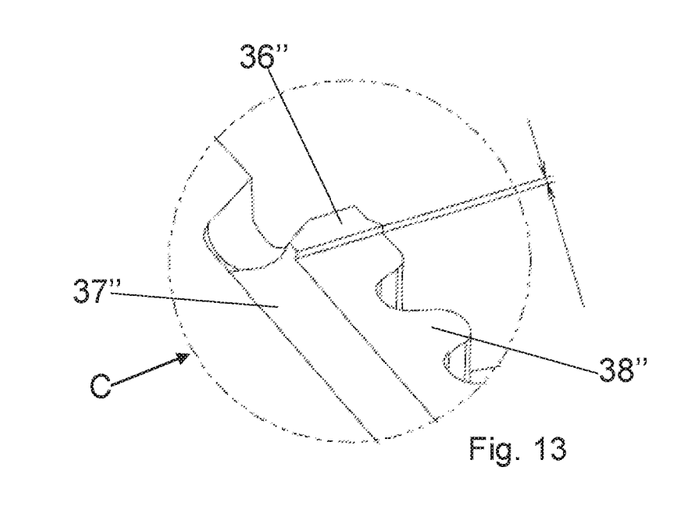
FIG. 13 shows an enlarged detail of FIG. 12.

In particular, surface 38' of the half-mold 31 is spaced apart from surface 38' of the half-mold 32; and surface 38" of the half-mold 31 is spaced apart from surface 38" of the half-mold 32. Therefore, two passageways of the neck mold 30 through which air and possible debris may pass, are defined.

Advantageously, since the drawing of the air from the molding cavity 5 is provided, a very small distance can be selected, for example from 0.005 to 0.01 mm, between the surfaces 38', 38" facing each other. Therefore, the impression on the preform due to the presence of the surfaces 38', 38" spaced apart from each other is minimal or substantially absent. Moreover, possible debris which may accumulate on the surfaces 38', 38" advantageously may be removed by means of the suction, and the accumulation thereof may be avoided or slowed down. The suction means 102 indeed may be connected to the channels 201, 202 so as to draw air from the molding cavity 5 towards the outside.

In a second variant (FIGS. 14 to 16), the neck mold 30, 30' is configured so that each surface 38', 38" of the half-mold 31 abuts, i.e. is in contact, with a respective surface 38', 38" of the half-mold 32 when the two half-molds 31, 32 are assembled to each other.

Figure 14:
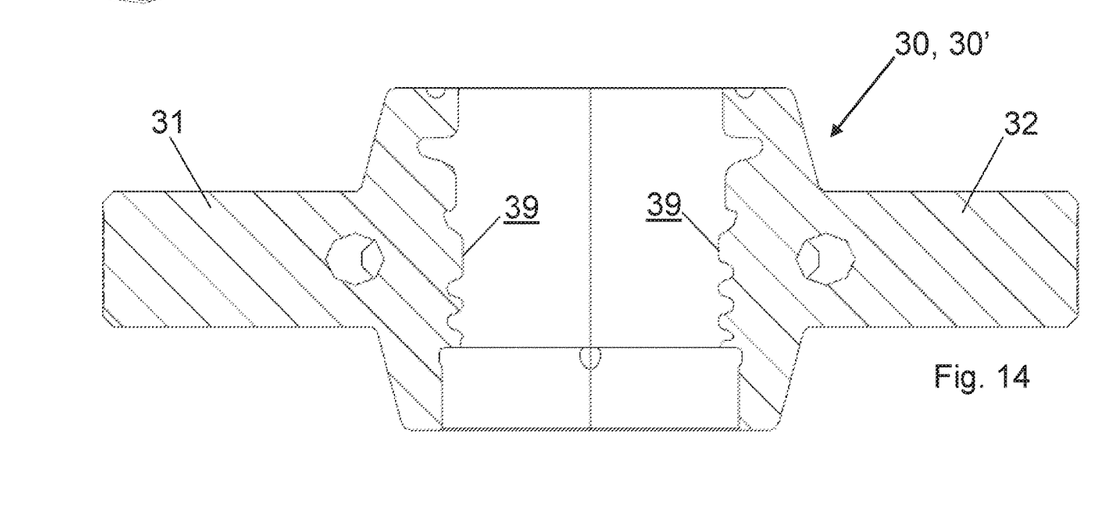
FIG. 14 shows a section of another example of two parts of a component of a device according to the invention.
Figure 15:
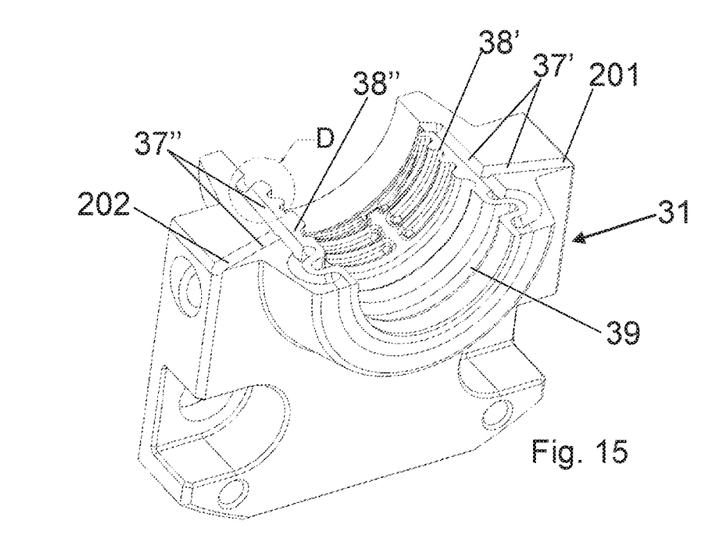
FIG. 15 shows a perspective view of a part of the component of FIG. 14.
Figure 16:
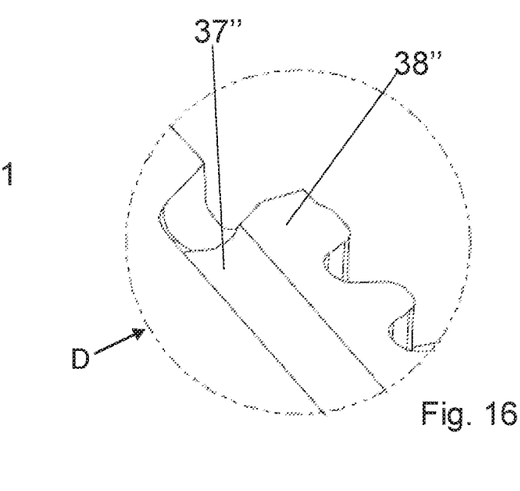
FIG. 16 shows an enlarged detail of FIG. 15.

In particular, with respect to the preceding variant, no ridges acting as spacers are provided.

Therefore, the possibility of linear defects due to the separation of the surfaces 38', 38" to form on the preform neck substantially is eliminated.

The configuration in which each surface 38', 38" of the half-mold 31 may abut with a respective surface 38', 38" of the half-mold 32 in particular is made possible by the suction of air from the molding cavity 5 by means of the suction means 102.

In all the embodiments, the suction means 102 may be connected to channel 2, 2' and/or to one or more channels 201, 202 delimited by the neck mold 30. The one or more channels 201, 202 of the neck mold 30, 30' are in communication with the molding cavity 5. Such channels 201, 202 may be delimited, for example by each groove 37', 37" of the half-mold 31 facing a corresponding groove 37', 37" of the half-mold 32, as described above.

Figures 1, 2:
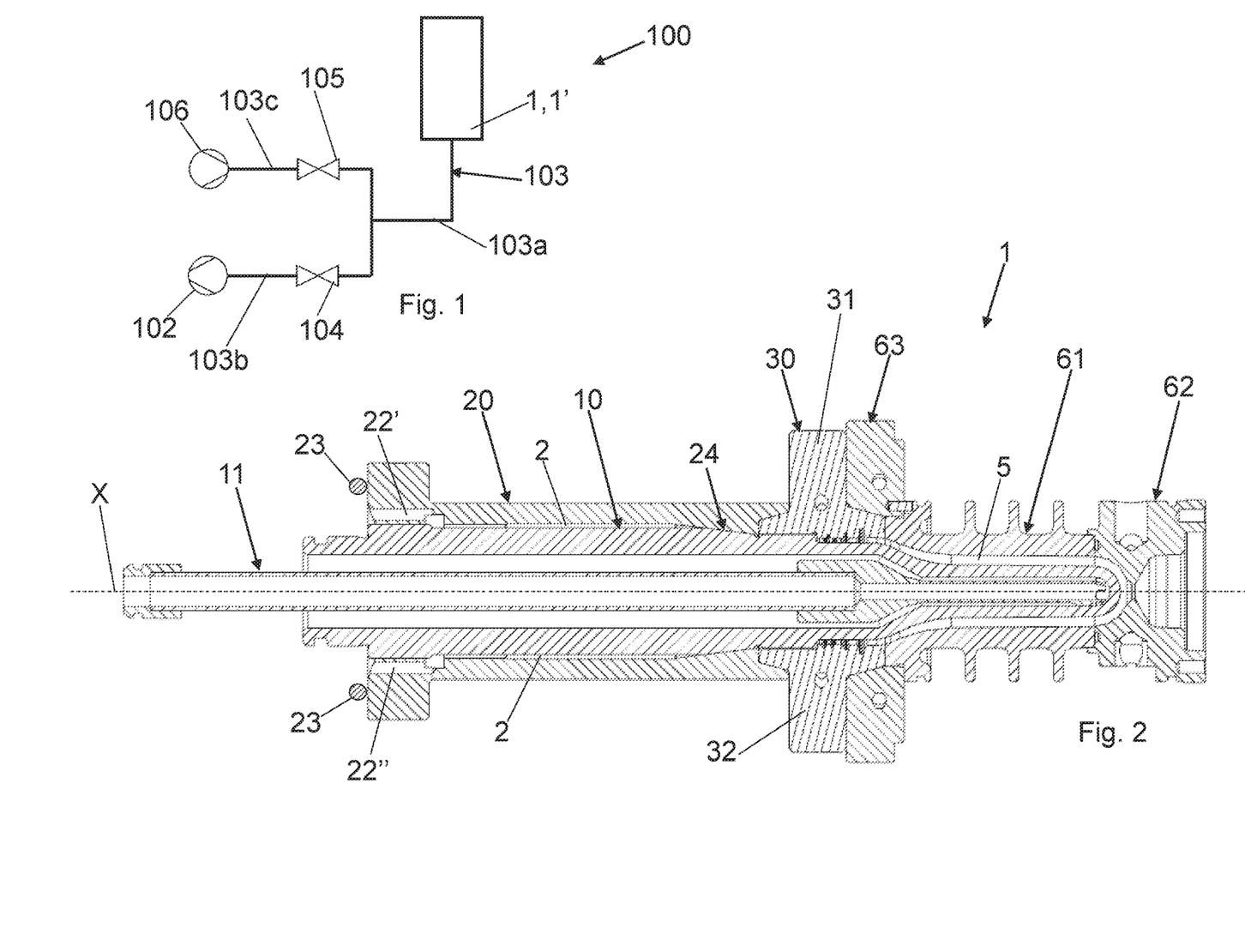
FIG. 1 diagrammatically shows an example of apparatus according to the invention.
FIG. 2 shows a section of an example of device according to the invention.

The non-limiting example of apparatus 100 shown in FIG. 1 provides the suction means 102 to be connected to the molding device 1, 1' (or to a plurality of molding devices 1, 1') by means of a conduit or a conduit system 103.

In particular, the suction means 102 preferably are connected to a plate, in particular a core-holder plate (not shown), to which the end portion of core 10, 10' is constrained.

In all the embodiments, the molding device 1, 1' preferably comprises a sealing ring 23, in particular an O-ring 23, for example an elastomeric sealing ring, to improve the sealing during the drawing.

In particular, the sealing ring 23 is arranged between the support ring 20, 20' and the plate (in particular, the core-holder plate). The suction air flow may therefore come out of the molding device 1, 1', in particular by crossing the stretch made in the end portion, for example through the holes 22', 22", and be introduced into the core-holder plate, from which it may exit.

The aforesaid conduit system may, for example, comprise a first stretch 103a connected to the molding device 1, 1'. When a plurality of molding devices 1, 1' is provided, a plurality of first stretches 103a preferably is provided, each connected to a respective molding device 1, 1'. The first stretch 103a is connected to a second stretch 103b and to a third stretch 103c. The second stretch 103b is connected to the suction means 102, for example a pump or a suction fan. A valve 104 preferably is provided between the first stretch 103a and the suction means 102. In particular, valve 104 preferably is arranged along the second stretch 103b.

The third stretch 103c is connected to means 106, for example a compressor, adapted to introduce air into the molding device 1, 1', for example through the tube 11. A valve 105 preferably is provided between the first stretch 103a and the means 106. In particular, valve 105 preferably is arranged along the third stretch 103c. Therefore, the suction means 102 may draw air from the molding device 1, 1' and the means 106 may introduce air into the molding device 1, 1' alternately according to the opening status of the valves 104, 105.

It is clear that also other configurations may be provided, for example a single three-way valve may be provided, or independent conduits may be provided for the suction means 102 and the means 106. The suction means 102 preferably are distinct from the means 106. The means 106 in any case are optional.

The invention also relates to a process for molding one or more bottle preforms which can be performed, for example by means of an apparatus 100.

Molten plastic is injected into the molding cavity 5 to mold a preform.

Advantageously, the process provides that air is drawn from the molding cavity 5, through said at least one channel 2, 2', 201, 202 for the air to pass from the molding cavity 5 towards the outside of the molding device 1, 1'. The air is drawn by means of the suction means 102, and in particular is conducted outside the molding device 1, 1'. The conduit of the molding device 1, 1' which puts the molding cavity 5 into communication with the suction means 102 may be conduit 2, 2' and/or one or both of the conduits 201, 202.

The air preferably is drawn from the molding cavity 5 before and/or during the injection of molten plastic into the molding cavity 5. In particular, the air may be drawn from the molding cavity 5 for all or part of the time during which the molten plastic is injected into the molding cavity 5.

As explained above, drawing the air from the molding cavity 5 in particular allows to avoid the formation of air pockets in the molding cavity and allows the molten plastic to adequately fill the molding cavity, in addition to other advantages described above.

After the injection of molten plastic, air preferably is introduced into the molding device 1, 1' by means of the means 106.

The invention claimed is:

1. An apparatus for molding one or more bottle preforms by injecting molten plastic, comprising
    at least one molding device provided
        with at least one molding cavity adapted to receive the molten plastic,
        and with at least one channel for air to pass from the at least one molding cavity towards the outside of the at least one molding device;
    wherein said at least one molding device comprises
    a first component, or core, adapted to mold an inner surface of the preform;
    a second component, or lock ring, arranged about the first component;
    and a third component, or neck ring, adapted to mold an outer surface of the preform neck;
    wherein said at least one channel is partially delimited by said first component and by said third component and partially by said first component and by said second component;
    wherein the first component comprises at least one first surface in contact with at least one second surface of the second component;
    wherein said first surface and/or said second surface are provided with at least one groove which partially delimits said at least one channel;
    wherein said first surface and said second surface are frustoconical in shape;
    wherein said at least one channel is adapted to be connected to suction means adapted to draw air from the at least one molding cavity;
    wherein the apparatus comprises said suction means connected to said at least one channel, which are adapted to draw air from said at least one molding cavity;
    wherein the suction means are connected to the at least one molding device by means of a conduit system;
    wherein said conduit system comprises a first stretch connected to a molding device of said at least one molding device;
    wherein the first stretch is connected to a second stretch and to a third stretch;
    wherein the second stretch is connected to said suction means;
    wherein the third stretch is connected to means adapted to introduce air into the at least one molding device;
    and wherein a first valve is provided between the first stretch and said suction means, and a second valve is provided between the first stretch and said means adapted to introduce air.

2. An apparatus according to claim 1, wherein said at least one channel comprises
    a first stretch delimited by a portion of the inner surface of the third component and by a portion of the outer surface of the first component, which portions face each other;
    a second stretch delimited by said at least one groove;
    and a third stretch delimited by a portion of the inner surface of the second component and by a portion of the outer surface of the first component, which portions face each other.

3. An apparatus according to claim 2, wherein said first stretch of said at least one channel is proximal to the molding cavity; and said second stretch of said at least one channel is between the first stretch and the third stretch of said at least one channel.

4. An apparatus according to claim 2, wherein said first stretch, second stretch and third stretch of said at least one channel are arranged in sequence with one another so that the air drawn from the molding cavity crosses the first stretch, the second stretch and the third stretch in sequence.

5. An apparatus according to claim 1, comprising an existing stretch made in an end portion, distal from the molding cavity, of the molding device, by means of which said at least one channel can communicate with the outside of the molding device with the suction means.

6. An apparatus according to claim 1, wherein there are provided two or more holes in an end portion of the second component; or an annular opening in the end portion of the second component; or one or more grooves on the outer surface of the end portion of the first component and/or on the inner surface of the second component; by means of which said at least one channel can communicate with the outside of the molding device, in particular with the suction means.

7. An apparatus according to claim 1, wherein said at least one channel said first stretch of said at least one channel, is delimited by non-molding surfaces of the third component.

8. An apparatus according to claim 1, wherein said third component comprises surfaces facing each other and adjacent to a molding surface of the third component, wherein said surfaces abut against each other, or wherein said surfaces are mutually spaced apart by a distance from 0.005 mm to 0.07 mm, or from 0.005 to 0.01 mm.

9. An apparatus according to claim 1, wherein, at least in some areas, said at least one channel is annular in shape.

10. An apparatus according to claim 2, wherein said first stretch and said third stretch of said at least one channel are annular in shape.

11. An apparatus according to claim 1, comprising a component, or body mold, adapted to mold the outer surface of the preform body; said component being distinct from said third component.

12. An apparatus according to claim 1, wherein there are no intermediate components between said third component and said first component; and/or wherein there are no intermediate components between said second component and said first component.

13. An apparatus according to claim 1, comprising a plurality of said molding devices, and wherein there is provided a plurality of said first stretches, each connected to a respective molding device of said plurality of molding devices.

14. A process for molding one or more bottle preforms performed by means of an apparatus according to claim 1,
wherein molten plastic is injected into the at least one molding cavity;
and wherein air is drawn from the at least one molding cavity, through said at least one channel for the air to pass from the at least one molding cavity towards the outside of the at least one molding device, by means of suction means connected to said at least one channel.

15. A process according to claim 14, wherein the air is drawn from the at least one molding cavity before and/or during the injection of molten plastic into the at least one molding cavity.

16. A process according to claim 14, wherein the air is drawn from the at least one molding cavity for all or part of the time during which the molten plastic is injected into the at least one molding cavity.

* * * * *